United States Patent
Herrero Molina et al.

(10) Patent No.: US 10,452,922 B2
(45) Date of Patent: Oct. 22, 2019

(54) IR OR THERMAL IMAGE ENHANCEMENT METHOD BASED ON BACKGROUND INFORMATION FOR VIDEO ANALYSIS

(71) Applicant: DAVANTIS TECHNOLOGIES SL, Bellaterra (ES)

(72) Inventors: Nicolas Herrero Molina, Bellaterra (ES); Marti Balcells Capellades, Bellaterra (ES); Jordi Lluis Barba, Bellaterra (ES)

(73) Assignee: DAVANTIS TECHNOLOGIES SL, Bellaterra (ES)

( * ) Notice: Subject to any disclaimer, the term of this patent is extended or adjusted under 35 U.S.C. 154(b) by 42 days.

(21) Appl. No.: 15/580,257

(22) PCT Filed: Jun. 13, 2016

(86) PCT No.: PCT/ES2016/070443
§ 371 (c)(1),
(2) Date: Dec. 6, 2017

(87) PCT Pub. No.: WO2016/203078
PCT Pub. Date: Dec. 22, 2016

(65) Prior Publication Data
US 2018/0225522 A1    Aug. 9, 2018

(30) Foreign Application Priority Data
Jun. 15, 2015  (ES) .................................. 201530836

(51) Int. Cl.
| | | |
|---|---|---|
| *G06K 9/00* | (2006.01) | |
| *G06T 5/00* | (2006.01) | |
| *G06K 9/32* | (2006.01) | |
| *G08B 13/196* | (2006.01) | |
| *G08B 29/24* | (2006.01) | |

(52) U.S. Cl.
CPC ....... *G06K 9/00771* (2013.01); *G06K 9/3233* (2013.01); *G06K 9/3241* (2013.01);
(Continued)

(58) Field of Classification Search
CPC ............ G06K 9/00771; G06K 9/3233; G06K 9/3241; G06T 2207/10028;
(Continued)

(56) References Cited

U.S. PATENT DOCUMENTS 5,046,118 A * 9/1991 Ajewole ................. G06T 5/008
358/461
5,970,164 A * 10/1999 Bamberger ............... G06T 5/40
378/37
(Continued)

FOREIGN PATENT DOCUMENTS

| CN | 103400351 A | 11/2013 |
|---|---|---|
| EP | 2226762 A1 | 9/2010 |

(Continued)

OTHER PUBLICATIONS

International Search Report and Written Opinion for PCT/ES2016/070443 dated Apr. 3, 2017, 27 pages.
(Continued)

*Primary Examiner* — Li Liu
(74) *Attorney, Agent, or Firm* — Squire Patton Boggs (US) LLP

(57) ABSTRACT

An image enhancement method for video analysis or automatic video surveillance systems has at least one image acquisition device, through which an IR thermal spectrum image is captured from an area of space, a scene calibration system and a detection system, through which at least one object type is detected. The method includes at least one processing stage in which the contrast of the captured image is enhanced by the image acquisition device through the image's depth or scene information obtained directly or indirectly by the scene calibration system or entered manually by the user.

13 Claims, 6 Drawing Sheets

(52) U.S. Cl.
CPC ........ *G06T 5/007* (2013.01); *G08B 13/19613* (2013.01); *G08B 29/24* (2013.01); *G06T 2207/10028* (2013.01); *G06T 2207/10048* (2013.01)

(58) Field of Classification Search
CPC .......... G06T 2207/10048; G06T 5/007; G08B 13/19613; G08B 29/24
See application file for complete search history.

(56) References Cited

U.S. PATENT DOCUMENTS

| | | | |
|---|---|---|---|
| 6,696,945 | B1 | 2/2004 | Venetianer et al. |
| 7,596,241 | B2 | 9/2009 | Rittscher et al. |
| 7,706,576 | B1 | 4/2010 | Beck et al. |
| 2006/0171573 | A1* | 8/2006 | Rogers ................. G06K 9/3233 382/128 |
| 2007/0269106 | A1* | 11/2007 | Huo ........................ G06T 5/007 382/168 |
| 2009/0214080 | A1* | 8/2009 | Hamza ................. G06K 9/0063 382/103 |
| 2010/0080485 | A1 | 4/2010 | Chen et al. |
| 2010/0157078 | A1* | 6/2010 | Atanassov .............. G06T 5/007 348/222.1 |
| 2010/0165111 | A1* | 7/2010 | Gorian ............... G06K 9/00771 348/164 |
| 2010/0304854 | A1 | 12/2010 | McEldowney |
| 2015/0348247 | A1* | 12/2015 | McLaughlin ........... G06T 5/009 382/131 |

FOREIGN PATENT DOCUMENTS

| | | |
|---|---|---|
| ES | 2364915 T3 | 9/2011 |
| ES | 2452790 A1 | 4/2014 |
| WO | WO 2013/126001 A2 | 8/2013 |

OTHER PUBLICATIONS

Aarnink, Rene G., et al: "A preprocessing algorithm for edge detection with multiples scales of resolution", Elsevier European Journal of Ultrasound, Jan. 1, 1997, 14 pages.
Aracena Pizarro, Diego, et al: "Comparación de técnica de calibración de cámaras digitales", Jan. 1, 2005, Revista Facultad de Ingeniería, Universidad de Tarapaca, vol. 3, No. 1, 12 pages.
Bai, Xiangzhi, et al: "Infrared image enhancement through contrast enhancement by using multiscale new top-hat transform", Dec. 22, 2010, Infrared Physics and Technology, vol. 54, No. 2, 9 pages.
Deng, Guang: "An entropy Interpretation of the Logarithmic image Processing Model with application to contrast Enhancement", May 1, 2009, IEEE Transactions on Image Processing, vol. 18, No. 5, pp. 1135-1140.
Gonzalez, Rafael C., et al: "Digital Image Processing" Second Edition, Pearson Education, p. 91, Nov. 28, 2001.
Hachicha, Walid, et al: "Combining depth information and the local edge detection for stereo image enhancement", presented at the 20th European Signal Processing Conference (EUSIPCO 2012), Bucharest, Romania, Aug. 27-31, 2012, pp. 250-254.
Hadi, H. Saipol, et al: "A review of Infrared Spectrum in Human Detection for Surveillance Systems", Jan. 1, 2013 International Journal of interactive Digital Media, vol. 1, No. 3, pp. 13-20, Section 3, figure 1.
Hartley, Richard, et al: "Multiple view geometry in computer vision" Second Edition, Cambridge University Press 2000 and 2003, 673 pages.
Hu, Jinhui, et al: "Kinect depth map based enhancement for low light surveillance image", ICIP 2013, pp. 1090-1094.
Jauregi, E., et al: "Approaches to door identification for robot navigation", Mar. 1, 2010, XP055319069, figure 6. Retrieved from the Internet: URL:http://cdn.intechopen.com/pdfs/10237/Intech-Approaches_to_door_identification_for_robot_navigation.pdf.
Jiwani, Munira A., et al: "Single image fog removal using depth estimation based on blur estimation", International Journal of Scientific and Research Publications, vol. 3, Issue 6, Jun. 2013, 6 pages.
Leu, Jia-Guu: "Image Contrast enhacement based on the intensities of edge pixels", CVGIP Graphical Models and Image Processing, vol. 54, No. 6, Nov. 1, 1998 (Nov. 1, 1992), pp. 497-506, XP000332318, Section 2.3, 1$^{st}$ paragraph.
Narasimhan, Srinivasa G., et al: "Contrast Restoration of weather degraded images", IEEE Transactions on Pattern Analysis and Machine Intelligence, vol. 25, No. 6, Jun. 2003, pp. 713-724.
Treibitz, Tali, et al: "Resolution loss without imagining blur", Journal of the Optical Society of America, vol. 29, No. 8, Aug. 1, 2012, p. 1516.

* cited by examiner

IR OR THERMAL IMAGE ENHANCEMENT METHOD BASED ON BACKGROUND INFORMATION FOR VIDEO ANALYSIS

TECHNICAL FIELD

The present invention is related to an image enhancement method for video analysis or automatic surveillance systems whose input image is either IR spectrum or thermal spectrum, in which depth or scene information is used to perform the enhancement.

BACKGROUND

Generic video analysis systems are used to determine the presence of people, vehicles or other specific objects (targets) in a certain area of space from images captured by an image acquisition device, preferably a fixed camera observing that area of space.

If the input image of this video analysis system is either an IR (infrared) or a thermal spectrum image, one of the main problems that the system faces is the lack of contrast between the background and foreground of the scene, thus making target detection more difficult. This is particularly the case with the thermal spectrum at warmer times of the year when ground temperatures can reach 37° C. and the detection of human targets is hindered due to lack of image contrast. This effect is further exacerbated in remote areas of the image where objects are smaller. This problem not only affects automatic video surveillance or analysis systems but also operator-verified systems.

Manufacturers of infrared spectrum cameras have attempted to alleviate the problem by adding software tools to their sensors to reduce contrast issues and improve image quality. The algorithms developed for this purpose enable adjustment of brightness or gain, basic histogram equalization or complex plateau-type histogram equalization or detail enhancement filters. For their part, manufacturers of video analysis systems, aware of these difficulties, have incorporated image and/or contrast enhancement modules to mitigate the problem.

The main drawback of the above-commented algorithms, however, is that enhancement is only based on information present in the image. In other words, they treat all pixels equally without making any assumptions about their nature (e.g. distance from which the temperature is projected or size of the person in the location).

However, it should be noted that the scientific literature includes documents that describe image enhancement methods based on scene and/or depth information, in which visible spectrum cameras are mainly used. The most significant documents are the following:

On the one hand, there are documents such as a patent application with publication number US2010/0304854 entitled "Image contrast enhancement in depth sensor" and a paper by Hachicha et al. presented at the 20th European Signal Processing Conference (EUSIPCO 2012), entitled "Combining depth information and the local edge detection for stereo image enhancement" in which the goal is not to enhance the quality of the image using a depth reference but to improve that depth estimation based on the image analyzed. In short, the above-mentioned process is performed in reverse.

The first of the documents cited, as an example, describes a system whose calculation of image depth is based on emitting structured light and analyzing its projection on the scene. The document seeks to enhance the quality of the projected structured light image to improve depth estimation.

In the second cited document, as an example, there is a stereo pair (visible image+depth map) and the method seeks to segment the objects in the image, enhance contrast and apply this information to improve the depth map.

On the other hand, there are documents such as the paper presented by Hu et al. at ICIP 2013, entitled "*Kinect depth map based enhancement for low light surveillance image*" and a patent application with publication number CN103400351A entitled "Low illumination image enhancing method and system based on KINECT depth graph", in which information from external devices (e.g. Kinect cameras) are applied to visible spectrum cameras. These devices provide us with a depth map of the scene associated with the image of the scene being observed with the visible spectrum camera in order to enable enhancement operations on this camera to be performed. Specifically, in the first case, a noise filter and histogram adjustment are performed, in which the depth image is incorporated into the overall image equalization.

A large number of references also exist, such as a document by Srinivasa et al. in IEEE Transactions on Pattern Analysis and Machine Intelligence, Vol. 25, No. 6, June 2003, entitled "*Contrast restoration of weather degraded images*" and a document by Munira at al. in the International Journal of Scientific and Research Publications, Volume 3, Issue 6, June 2013, entitled "*Single image fog removal using depth estimation based on blur estimation*" whose methods aim to enhance the quality of images that are affected by weather conditions (e.g. fog or pollution) by estimating the depth of the scene based precisely on these effects. Specifically, the more blurred an area of the image, the further away the camera. Once the depth estimation is obtained, it is used to cancel the effects on the image of the atmospheric conditions, thereby enhancing its quality.

Another group of documents should also be noted, such as a patent with publication number U.S. Pat. No. 7,706,576, entitled "Dynamic video equalization of images using face-tracing", in which objects of interest are detected to improve their quality. In the document cited as an example, t is assumed that the face of a person is visible in the scene, this face is detected and an algorithm is applied to enhance the image in the region occupied by the face. In reality, scene information is being applied in order to enhance at least one area of the image.

In terms of scientific documents relating to methods for improving IR thermal images, the most significant, among the few that exist, are a patent application with publication number EP2226762, entitled "Equalization and processing of IR images" and a PCT patent application with publication number WO2013126001, entitled "Image processing method for detail enhancement and noise reduction", which use local or overall information from the image itself, but never any depth or scene information. The main drawback of these methods is that the images still contain areas of insufficient contrast to detect objects.

The present invention is an image enhancement method for video analysis or automatic surveillance systems whose input image is either an IR spectrum image or a thermal spectrum image, in which depth or scene information is used to provide the resulting image with sufficient contrast to determine the presence of a particular object.

SUMMARY OF INVENTION

The present invention overcomes all of the above-mentioned drawbacks and shortcomings in the state of the art to achieve the purpose described in the preceding paragraph.

Video analysis or automatic surveillance systems consist of at least one image-acquisition device, through which different images of the area of the specific space are obtained, and an image scanning system, which together provide the output digital image.

The image then passes through an image processing system that applies at least one enhancement image process such that the output image has sufficient quality to enable the detection of a specific object type (person, animal or any other user-defined object).

Particularly, video analysis or automatic surveillance systems have at least two operating modes—system calibration and detection. These operating modes are activated by their respective calibration and detection systems.

The calibration operating mode is generally used at the start of operation of the video analysis or automatic surveillance system. The purpose of the calibration operating mode is to provide the image with a spatial reference so that the detection system can reference all of the calculations performed during the detection process: distance, speed, size of objects, etc. Specifically, the calibration stage performed by the calibration system may provide the equivalence between the approximate size of the target object in pixels (usually a person) and each of the coordinates of the pixels of the image.

This invention is an image enhancement method for video analysis or automatic surveillance systems whose input image is IR or thermal spectrum, in which the image's depth or scene information is used to perform this. The first step of the procedure is for the user to enter the depth or scene information or use the information from the calibration stage or calibration system since obtaining the variation of the approximate size of the target object for each of the coordinates of the pixels of the image is an indirect way of establishing the depth of the real scene captured in the image.

It should be pointed out that this can be carried out using any calibration procedure for obtaining such results, the most representative of which are the following:

A strong calibration procedure based on obtaining intrinsic camera parameters (focal length, pixel size, radial lens distortion, etc.) and extrinsic parameters (height and angular orientation) to measure distance and real speed on the image and extrapolate the sizes of the target objects for each pixel using basic geometry. Any of the procedures described in "Multiple view geometry in computer vision" by Hartley, R and Zisserman, A, Cambridge University Press, 2003, should preferably be used.

A weak calibration procedure in which, from a series of observations of a type of target object, the size of the target object is associated with each of the pixels in the image either by brute force (one observation/one pixel) or by interpolating a geometric model estimated on the basis of a limited number of observations. The procedures described in patent application U.S. Pat. No. 7,596,241, "System and method for automatic person counting and detection of specific events" or patent application ES2364915, "Video tripwire" should preferably be used.

As well as these two types of calibration procedure, the procedure described in Spanish patent ES2452790, "Procedimiento y sistema de análisis de imágenes" can also be used as a preferred embodiment of the image enhancement method for video analysis or automatic video surveillance systems. This is a weak calibration procedure in terms of parameter estimation (since it only refers to extrinsic parameters) but robust in terms of accuracy and error correction, and consists, as explained in the above application, of at least the following phases:

Sample acquisition phase divided into the following sub-phases:
  image acquisition sub-phase;
  image processing sub-phase, which determines whether there is a moving object in the image; and
  person pre-classification sub-phase, which determines whether or not the moving object is a person and stores its size and position information in case it is; and Calibration phase which obtains the size of a person for each position of the image based on the size and position data obtained for each object identified as a person in the sample acquisition phase.

Once the image's depth or scene information has been obtained, it is possible to enter and detail the actual image enhancement procedure. To do so, it should be noted that there are two main types of image enhancement procedure, known as spatial filtering and equalization.

The purpose of the invention is therefore to apply this image depth or scene information to this type of image enhancement procedure in order to improve the contrast of video analysis or automatic surveillance images.

Regarding the first type, known as spatial filtering, it should be pointed out that it is based on selecting and applying a filter to the image to reduce noise, enhance detail, soften the image, etc., thereby obtaining an image with better contrast. These filters are nothing more than small sub-images that convolve with the main image and generate a response. Thus, depending on the size of the filter, we deal with different information scales in the image.

Spatial filtering and the way that it is applied should preferably be based on at least the following steps:

For each point of the image, the size of target object (w,h) in pixels is obtained using the calibration system, wherein w and h are the width and height respectively of the target object in pixels at that point.

For each point of the image, a spatial filter is constructed of size between 3×3 pixels and max(w,h)×max(w,h), and Each point of the image is convolved with the spatial filter of the size corresponding to that point.

The purpose of the invention then is for the filters to adjust their size variably in each position of the image based on the depth or scene information of the image obtained during the calibration phase. This information should preferably include at least the size of the target object estimated during calibration.

For example, if spatial filtering is used to reduce noise, it is possible to choose between filters that reduce noise in the spatial domain, among which are linear filters, e.g. mean filters, and non-linear filters, e.g. median or bilateral filters, and filters that reduce noise in the transformed domain, among which are filters based on the wavelet transform.

Regardless of the filter chosen, however, it must be able to adapt its size in each position of the image based on the depth or scene information obtained during the calibration phase.

Moreover, in relation to other techniques such as detail enhancement or high pass filtering, these should adjust the sizes of their filters depending on the depth or scene information obtained during the calibration phase.

It should be noted that when applying spatial filtering to the whole image, undesired effects can be caused in certain regions. For this reason, in another preferred embodiment, it is possible to restrict the area of application of the spatial filtering to sub-region of interest $r_f$, where $r_f$ is a sub-set of the domain of input image I. In turn, to soften the filtering effect, it is also possible to combine the filtered image and the original image on a weighted basis.

Regarding the second type i.e. equalization, it should be noted that the equalization of an image is the normalization of its histogram. In other words, the main idea is that, given input image I, this input image is transformed according to information from its histogram such that the output image comprises a histogram as flat as possible.

So, if we define I as the input image whose possible values i range from $0 \leq i \leq L-1$, the probability of input image I having value i is defined as:

$$p_I(i) = p(I = i) = \frac{n_i}{n}$$

where $n_i$ is the total number of pixels whose value is equal to i, and n to the total number of pixels in the image. Through this histogram, we have a reference of the probability of each gray level in input image I. The following step is to apply transformation T to the entire input image I so that output image O=T(I) has a histogram that is as flat as possible, thereby improving the contrast of the image and therefore its quality. This output image O is also known as an equalized image.

The preferred embodiment of the transformation function is shown on page 91 of the book by González and Woods entitled "*Digital Image Processing*", Prentice Hall, 2002.

In short, this simple equalization consists of at least the following steps:
1—Calculate histogram $p_I(i)$ of the entire input image and its corresponding transformation function T
2—Apply this transformation to the entire input image and obtain the equalized image O=T(I)

It should be noted that input and output images are usually defined with the same number of bits, 8 per pixel, with a range of 256 possibilities existing ($2^8$). Some acquisition devices, however, such as thermal cameras, use 14 bits per pixel, meaning that, if the output image is kept at 8 bits per pixel, the equalization needs to reduce the input image's space of 16,384 possibilities ($2^{14}$) to the output image's 256 possibilities.

In turn, as happened with the spatial filtering image enhancement process, it is possible to use the image's depth or scene information to significantly improve the contrast of the image.

For equalization, the depth or scene information is used to focus the image enhancement on areas where objects to be detected by the video analysis system are smaller, so that the contrast is as high as possible for areas in which detection is difficult.

That is, step number 1 of the procedure is modified for simple equalization, calculating transformation T using only pixel information from the regions where target objects are smaller. By doing so, contrast in areas of difficult detection is maximized, but it can adversely affect easy detection areas (large target objects).

This means that it is necessary to also define the regions of the image in which target objects are smaller, which is known as region of interest (ROI).

This region is not restricted to any particular shape or size to the extent that it may well be composed of sub-regions. It is preferably defined as a rectangle $$r=[x,y,w,h]$$

where x and y correspond to the coordinates of the upper corner of r, while w and h correspond to the width and height values of the region in pixels.

Moreover, the sub-image formed by the pixels of input image I contained in region r is defined as $I_r$ and the histogram of this sub-image as $$p_{I_r}(i) = p(I_r = i) = \frac{n_{ir}}{n_r}$$

where $n_{ir}$ is the total number of pixels in sub-image $I_r$ whose value is equal to i, and $n_r$ to the total number of pixels in sub-image $I_r$. Thus, if the transformation in the simple histogram equalization was obtained as a function of the histogram of input image $T=f(p_I(i))$, a new transformation $T_r$ is defined as a transformation function whose calculation is based on the histogram of the pixels in region of interest $T_r=f(p_{I_r}(i))$. This new transformation $T_r$ can then be applied to the entire input image. When applied to the entire input image, however, negative effects can be produced in certain areas of the image (such as increased noise or saturation of levels of gray). To avoid this, step 2 of the procedure is also modified for simple equalization and this transformation $T_r$ is only applied to one sub-region $r_o$. This sub-region $r_o$ should always include at least region r where the histogram has been calculated and should always be larger than it, enabling $r_o$ to become the entire input image. If $D_I$ expresses the domain of input image I, that is to say $D_I=[0, I_w-1]\times[0, I_h-1]$ where $I_w$ is the total width of the image and $I_h$ the total height of the image, mathematically, it would appear that region r is a proper sub-set of $r_o$ and $r_o$ is a sub-set of $D_I$, that is to say $r \subsetneq r_o \subseteq D_I$.

The image enhancement process then based on simple equalization consists of at least the following steps:
1—Calculate the histogram of the input image pixels contained in region of interest $p_{I_r}(i)$ and use this information to obtain the corresponding transformation function $T_r$;
2—Apply this transformation $T_r$ to the entire input image I or sub-region $r_o$ of the input image to obtain equalized image $O=T_r(r_o)$, with r being a proper sub-set of $r_o$, that is to say $r \subsetneq r_o \subseteq D_I$ By doing so, contrast is maximized in areas of difficult detection, but it can affect easy detection areas (e.g. areas in which target objects are larger). The fact of applying transformation $T_r$ to sub-region $r_o \supsetneq r$ rather than to the entire input image I also allows exclusion of possible areas of conflict in this equalization process.

BRIEF DESCRIPTION OF THE DRAWINGS

The above and other advantages and features are easier to understand from the following detailed description of certain embodiment examples with reference to the accompanying drawings, which should be considered as illustrative and not limiting, in which.

DETAILED DESCRIPTION

Figure 1:
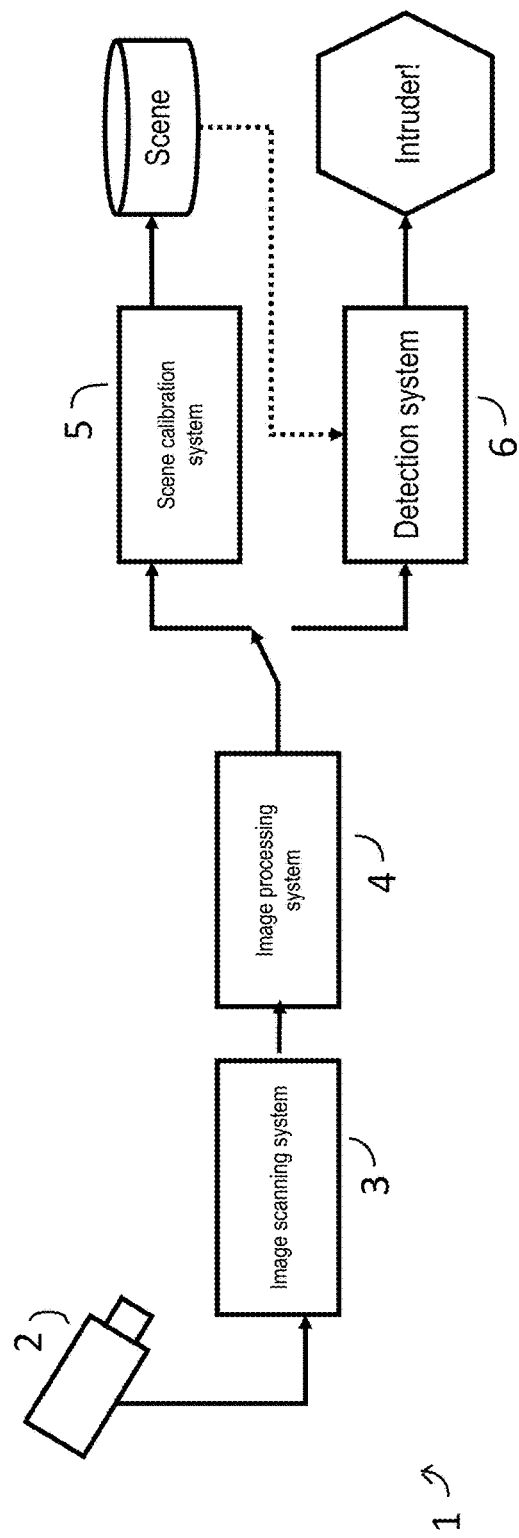
FIG. 1 illustrates a block diagram of a video analysis or video surveillance system according to the invention.

FIG. 1 is a block diagram of a video analysis or automatic surveillance system (1) according to the invention, consisting of at least one image acquisition device (2) to obtain images from one area of the space; a scanning system (3) to provide the digital image obtained from the image acquisition device (2); an image processing system (4) and two alternative operating systems; a scene calibration system (5); and a detection system (6).

The image acquisition devices (2) enable IR or thermal spectrum images to be obtained. These should preferably be fixed cameras with this type of image capture. Also included are image acquisition devices (2) which obtain images in the near IR spectrum, such as day/night cameras which operate with this section of the electromagnetic spectrum for nighttime surveillance.

Note that certain image acquisition devices (2) already feature an image scanning system (3) to provide the video analysis or automatic surveillance system (1) with digital images. The image scanning system (3) thus may not be included in the video analysis or automatic surveillance system (1).

If the image acquisition device (2) already enables a digital image to be obtained or features an image scanning system (3), it can be set up to transmit images by any transmission means (cable, fiber, wireless, etc.).

The image processing system (4) applies at least one image enhancement procedure so that, on output, the image has sufficient quality to enable detection of a particular type of object, preferably a person.

As mentioned, the video analysis or automatic surveillance system (1) has two alternative ways to operate, a detection system (6) and a scene calibration system (5).

The detection system (6) is applied regularly during the operation of the video analysis or automatic surveillance system (1) as it is the system that detects particular objects, preferably people.

The scene calibration system (5) should preferably be applied only once at the beginning of the start-up of the video analysis or automatic surveillance system (1) and has to provide the image with a spatial reference so that the detection system (6) can reference all of the calculations that it performs during the detection process: calculation of distance traveled, speed, size of objects, etc., as well as providing direct or indirect information on the depth of the real scene captured in the image for the image processing system (4).

The scene calibration system (5) should preferably be any type of system that obtains the depth of the real scene captured in the image either directly or indirectly. In a preferred embodiment, the scene calibration system (5) is a system that obtains the variation of the approximate size of the target object for each of the coordinates of the pixels of the image as it is an indirect way of measuring the depth of the real scene captured in the image.

Figure 2:
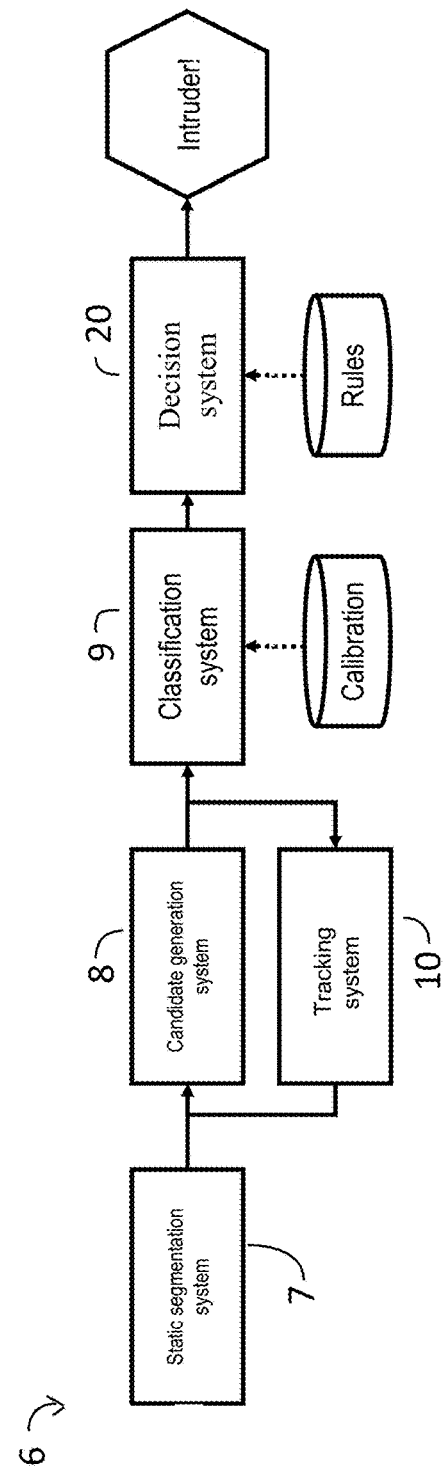
FIG. 2 shows a block diagram of the detection system.

FIG. 2 is a block diagram of the detection system (6), consisting of a static scene segmentation system (7), a candidate generation system (8), a classification system (9), a tracking system (10) and a decision system (20).

The static scene segmentation system (7) classifies the pixels into at least two types: moving objects and objects belonging to the background of the image.

The candidate generation system (8) groups the pixels that relate to moving objects and assigns a unique identifier to each moving object in the image.

Both the static segmentation system (7) and the candidate generation system (8) require a sufficiently contrasted image.

The classification system (9) classifies moving objects according to whether or not they are target objects, preferably people, and/or vehicles. As just mentioned, this system needs the scene information obtained during the calibration phase to perform the necessary calculations (measurement of speed, size, distance traveled, etc.) in order to classify objects and hence the FIG. 2 block diagram features a calibration block to reference this information need.

The tracking system (10) maintains temporal coherence of the objects so that, depending on the detection rules entered by the user, the respective intrusion alarms can be generated.

The decision system (20) is responsible for determining, according to the rules (hence the rules block in the diagram for referencing this information need), whether the objects classified by the classification system (9) should be considered as intruders, and if so, generating the appropriate alarm.

Figure 3:
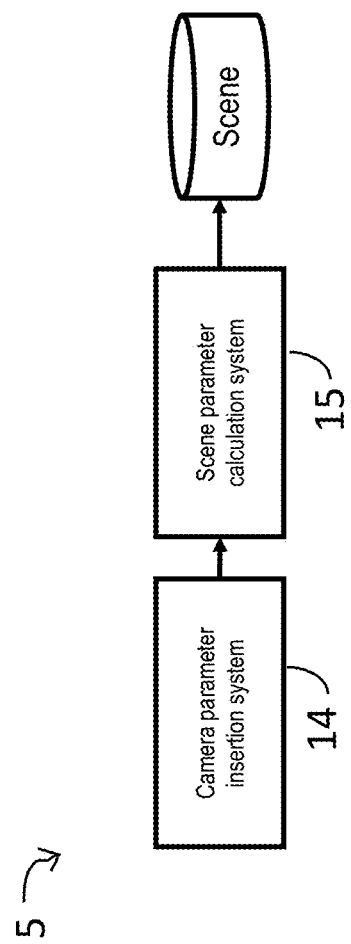
FIG. 3 shows a block diagram of a scene calibration system based on a strong calibration procedure.

FIG. 3 is a block diagram of the scene calibration system (5) based on a strong calibration procedure, such as that described by Hartley, R and Zisserman, A in "*Multiple view geometry in computer vision*", Cambridge University Press, 2003.

This calibration system (5) can consist of at least one parameter insertion system in the image acquisition device (14) and a scene parameter calculation system (15).

The image acquisition device's parameter insertion system (14) obtains, either directly or through the user, the intrinsic parameters of the image acquisition device (2), such as focal length, pixel size, radial lens distortion, and the extrinsic parameters, such as height and angular orientation.

The scene parameter calculation system (15) obtains the size of the target objects for each pixel.

Figure 4:
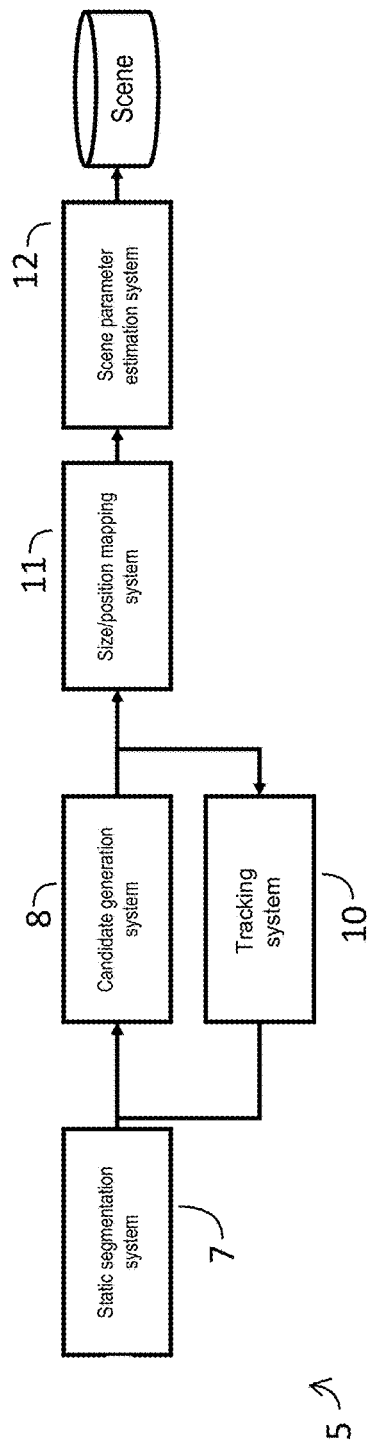
FIG. 4 illustrates a block diagram of a scene calibration system based on a weak calibration procedure.

FIG. 4 is a block diagram of the scene calibration system (5) based on a weak calibration procedure, such as that described in patent ES2452790, "Procedimiento y sistema de análisis de imágenes".

As shown, the scene calibration system (5) consists of at least one static scene segmentation system (7), a candidate generation system (8), a tracking system (10), a mapping system for observed size/position (11) and a scene parameter estimation system (12).

The static scene segmentation (7), candidate generation (8) and tracking (10) systems should preferably perform the same functions as those described in the detection system (6), and can even be the same.

The size/position mapping system (11) obtains the variation of the approximate size of the target object for each of the coordinates of the pixels in the image.

The scene parameter estimation system (12) allows other parameters necessary for the detection system (6) to be obtained, such as measurement of speed, size and distance traveled.

In a preferred embodiment, the scene calibration system (5) of the video analysis or automatic surveillance system (1), according to the invention, uses the calibration procedure described in Spanish patent ES2452790 "Procedimiento y sistema de análisis de imágenes" to obtain depth or scene information.

Figure 5:
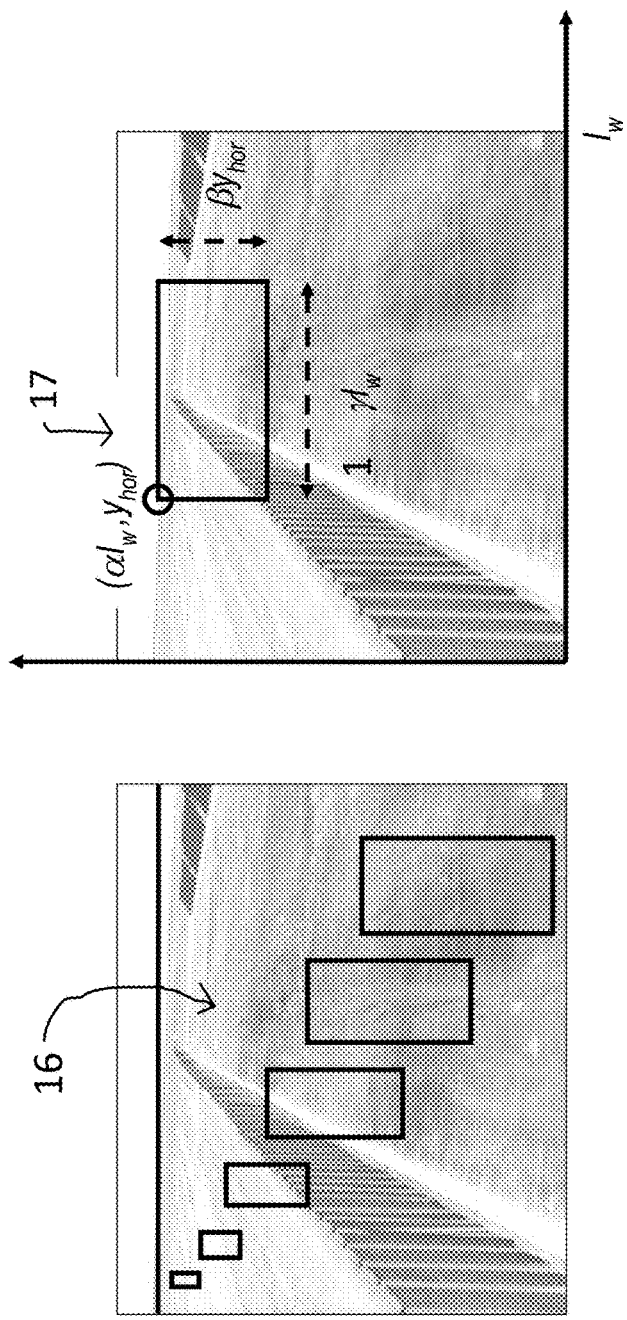
FIG. 5 shows an image to which a scene calibration system has been applied.

Independent of the calibration procedure used by the scene calibration system (5), FIG. 5 shows an image to which the calibration system has been applied and in which rectangles (16) indicate the approximate size of the target object, preferably people, at the point where a rectangle (16) is drawn.

The image processing system (4), according to the invention, performs an image enhancement procedure consisting of a processing stage in which, through the depth or scene information entered by the user or obtained through any scene calibration system (5), but preferably those using the above-described procedures, the contrast of the images captured by the image acquisition device (2) are improved.

In a preferred embodiment, the image processing system (4) consists of at least one filter that adjusts its size variably in each position of the image based on the image's depth or scene information, preferably a percentage of the size of the target object which has been estimated by the scene calibration system (5). This spatial filtering can be applied to the entire image or just region of interest $r_f$. The criteria for defining region of interest $r_f$ are preferably:

Region defined manually by the user; or

Region in which the target objects are smaller; or

Transit areas during the scene calibration process (5), defined as those areas where samples were obtained during the acquisition phase described in Spanish patent ES2452790, "Procedimiento y sistema de análisis de imágenes".

For the criterion in which target objects are smaller, two sizes of person should preferably be defined in pixels: $T_{min}$ (minimum object size capable of being detected by the detection system (6)) and provided by the detection system (6)) and $T_{max}$ which corresponds to the maximum possible size of a target object in the image (which is given by the calibration system (5)). So in this case, the criterion for defining region of interest $r_f$ will be all of the pixels for which the expected object size given by the scene calibration system (5) is situated in the range $(T_{min}, T_{min}+\varepsilon(T_{max}-T_{min}))$. With $\varepsilon$ being a number between 0 and 1.

As previously explained, there are calibration procedures comprising associating observed object sizes with the position in which they were observed in order to estimate the geometric model describing the scene, among which, preferably, the scene calibration system (5) uses that described in Spanish patent ES2452790, "Procedimiento y sistema de análisis de imágenes" In these cases, a criterion for defining the region of interest ($r_f$) should preferably consist of at least the following steps:

Divide the image into N resizable cells;

Mark the cells in which the calibration system (5) has obtained at least one sample.

Define the region of interest ($r_f$) as the convex area that surrounds the marked cells.

The regions of interest ($r_f$) are not restricted to any shape or size.

The region of interest ($r_f$) should preferably be defined as a rectangle (17)

$$r_f=[x,y,w_{r_f},h_{r_f}]$$

where x and y correspond to the coordinates of the upper corner of $r_f$, while $w_{r_f}$ and $h_{r_f}$ correspond to the width and height values of the region in pixels.

In video analysis or video surveillance scenes, the relevant content at object detection level is usually centered in the image so preferably $$r_f=[x,y,w_{r_f},h_{r_f}]=[\alpha I_w, y_{hor}, \gamma I_w, \beta y_{hor}]$$

is defined, where $\alpha, \gamma, \beta \in (0,1)$ and $(\alpha+\gamma)<1$; $I_w$ is the total width of the input image; and $y_{hor}$ is the vertical coordinate delimiting the detection limit (preferably, the vertical coordinate from which the expected size of the target object, preferably a person, is smaller than the minimum size that the system needs to detect it) which the user can enter or can be obtained from the calibration system (5).

FIG. 5 contains a rectangle (17) that defines a region of interest for that image.

It is noted that this type of rectangular region is useful for any scene calibration system (5) as the final calibration result is a person size map per pixel.

Applying spatial filtering can produce unwanted effects in certain areas of the image. To minimize these effects, it is possible to soften the filtering result by combining the filtered and unfiltered images in the following way:

$$I_F(x,y)=g(x,y)\cdot O(x,y)+(1-g(x,y))\cdot I(x,y)$$

Wherein weighting function g(x,y), in the most general case, is a function that takes values between 0 and 1, O(x,y) is the filtered image and I(x,y) is the input image.

Whether spatial filtering is applied to the entire image or region of interest $r_f$, this region of interest $r_f$ can be used to define weighting function g(x,y) which is preferably a two-dimensional Gaussian function centered on the region of interest ($r_f$) and with standard deviations based on the width and height dimensions of the region of interest ($r_f$), leaving the center of the Gaussian as:

$$\mu=(\mu_x,\mu_y)=\left(\alpha I_w+\frac{\gamma I_w}{2}, y_{hor}-\frac{\beta y_{hor}}{2}\right)$$

and its standard deviation vector as $$\sigma=(\sigma_x,\sigma_y)=(\alpha I_w, \beta y_{hor})$$

Consequently, function $$g(x,y)=e^{-\frac{1}{2}\left(\left(\frac{x-\mu_x}{\sigma_x}\right)^2+\left(\frac{y-\mu_y}{\sigma_y}\right)^2\right)}$$

As can be observed, value g(x,y) in the center of the region of interest ($r_f$) is maximum (equal to 1) and, as the values of x or y move away from the center, the value of g(x,y) decreases and the unequalized image therefore starts to become relevant since function 1−g(x,y) increases.

Consequently, this stage has a smoothing effect on the filtering and can be viewed as the introduction of an artificial spotlight that illuminates the area of the region of interest ($r_f$).

In another preferred embodiment, the image processing system (4) consists of at least one equalization process which uses the depth or scene information obtained through the scene calibration system (5).

This equalization process should preferably be based on a simple equalization procedure focused on a region that is considered to be of interest (r). The criteria for defining this region of interest are preferably:
- Region defined manually by the user; or
- Region in which the target objects are smaller; or
- Transit areas during the scene calibration process (5), defined as those areas where samples were obtained during the acquisition phase described in Spanish patent ES2452790, "Procedimiento y sistema de análisis de imágenes"

For the criterion in which target objects are smaller, two sizes of person should preferably be defined in pixels: $T_{min}$ (minimum object size capable of being detected by the detection system (6) and provided by the detection system (6)) and $T_{max}$ which corresponds to the maximum possible size of a target object in the image (which is given by the calibration system (5)). So in this case, the criterion for defining the region of interest (r) will be all of the pixels for which the expected object size given by the scene calibration system (5) is situated in the range $(T_{min}, T_{min}+\varepsilon(T_{max}-T_{min}))$. With $\varepsilon$ being a number between 0 and 1 that allows the equalization level to be adjusted.

As previously explained, calibration procedures exist that consist of associating observed object sizes with the position in which they were observed in order to estimate the geometric model describing the scene, among which, preferably, the scene calibration system (5) uses that described in Spanish patent ES2452790, "Procedimiento y sistema de análisis de imágenes" In these cases, a criterion for defining the region of interest (r) should preferably consist of at least the following steps:
- Divide the image into N resizable cells;
- Mark the cells in which the calibration system (5) has obtained at least one sample.
- Define the region of interest as the convex area that surrounds the marked cells.

The regions of interest (r) are not restricted to any shape or size.

The region of interest (r) should preferably be defined as a rectangle (17)

$$r=[x,y,w,h]$$

where x and y correspond to the coordinates of the upper corner of r, while w and h correspond to the width and height values of the region in pixels.

In video analysis or video surveillance scenes, the relevant content at object detection level is usually centered in the image so preferably $$r=[x,y,w,h]=[\alpha I_w, y_{hor}, \gamma I_w, \beta y_{hor}]$$

is defined, where $\alpha, \gamma, \beta \in (0,1)$ and $\alpha+\gamma<1$; $I_w$ is the total width of the input image; and $y_{hor}$ is the vertical coordinate delimiting the detection limit (preferably, the vertical coordinate from which the expected size of the target object, preferably a person, is smaller than the minimum size that the system needs to detect it) that the user can enter or can be obtained from the calibration system (5).

FIG. 5 contains a rectangle (17) that defines a region of interest for that image.

This type of rectangular region is useful for any scene calibration system (5) as the final calibration result is a person size map per pixel.

In a preferred embodiment, the equalization process defines a sub-image formed by the pixels of input image I contained in region r is defined as $I_r$ and the histogram of this sub-image as $$p_{I_r}(i) = p(I_r = i) = \frac{n_i}{n_r}$$

In addition, a new transformation $T_r$ is defined as the transformation function whose calculation is based on the histogram of the pixels in region of interest $T_r=f(p_{I_r}(i))$.

In short, a preferred embodiment of the equalization process consists of at least the following steps:
1—Calculate the histogram of the input image pixels contained in region of interest $p_{I_r}(i)$ and use this information to obtain the corresponding transformation function $T_r$;
2—Apply this transformation $T_r$ to the entire input image I or sub-region $r_o$ of the input image to obtain equalized image $O=T_r(r_o)$, where $r \subsetneq r_o \subseteq D_I$.

As mentioned previously, equalizing certain areas of the image with a histogram that does not correspond to the areas can harm the contrast in these areas with the appearance of unwanted effects such as noise, gray level saturation, etc. Thus, in a preferred embodiment, an equalization smoothing stage is proposed using a weighted sum of the equalized image with the above method and an unequalized image in the following way:

$$I_F(x,y)=g(x,y)\cdot O(x,y)+(1-g(x,y))\cdot I(x,y)$$

Where weighting function g(x,y) can be any type of function whose value at the center of the region of interest is maximum, but is preferably a two-dimensional Gaussian function centered on the region of interest (r) and with standard deviations based on the width and height dimensions of the region of interest (r), leaving the center of the Gaussian as:

$$\mu = (\mu_x, \mu_y) = \left(\alpha I_w + \frac{\gamma I_w}{2}, y_{hor} - \frac{\beta y_{hor}}{2}\right)$$

and its standard deviation vector as $$\sigma=(\sigma_x,\sigma_y)=(\gamma I_w, \beta y_{hor})$$

Consequently, the function $$g(x,y) = e^{-\frac{1}{2}\left(\left(\frac{x-\mu_x}{\sigma_x}\right)^2 + \left(\frac{y-\mu_y}{\sigma_y}\right)^2\right)}$$

As can be observed, value g(x,y) in the center of the region of interest (r) is maximum (equal to 1) and, as the values of x or y move away from the center, the value of g(x,y) decreases and the unequalized image therefore starts to become relevant since function 1−g(x,y) increases.

Consequently, this stage has a smoothing effect on the equalization and can be viewed as the introduction of an artificial spotlight that illuminates the area of the region of interest (r).

So far, a basic equalization procedure has been described in which the depth or scene information obtained through the scene calibration system (5) is used. However, it can be considered that there are two types of equalization process depending on the nature of the input image, local equalization process and remote equalization process.

Figure 6:
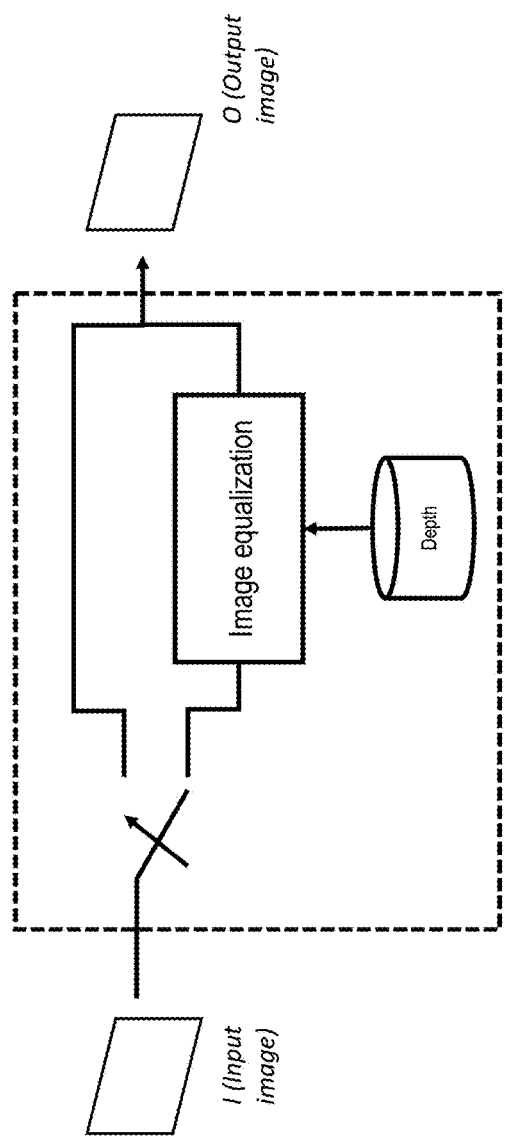
FIG. 6 shows an equalization procedure.

The local equalization process is the simplest and is that shown in FIG. 6. As can be observed, in this type of equalization process, the image from the image acquisition device (2) or the image resulting from applying the image scanning system (3) is equalized using depth information from the scene calibration system (5) of the video analysis or automatic surveillance system (1).

Since the dynamic range of the image, i.e. the range of values of most of the pixels, is occasionally too small, it can cause excessive noise to be introduced when expanding the histogram during equalization. This noise is not desirable in the image because it can lead to false alarms generated by the detection system (6). Because of this, in a preferred embodiment, the equalization process, according to the invention, includes a step that studies the histogram range through calculation of the entropy in the region of interest—a measurement that, although indirect, is much more robust than simply studying the width of the histogram.

In this regard, the entropy of the image in the region of interest is defined as:

$$H_r(t) = -\sum_r p_{I_r}(t) \cdot \log(p_{I_r}(t))$$

This metric will be greater the more the histogram has a uniform probability distribution and the wider the dynamic range of the image.

Thus, two threshold values are set for activating (on) or deactivating (off) the equalization: $H_{HL}$ and $H_{LH}$.

Figure 7:
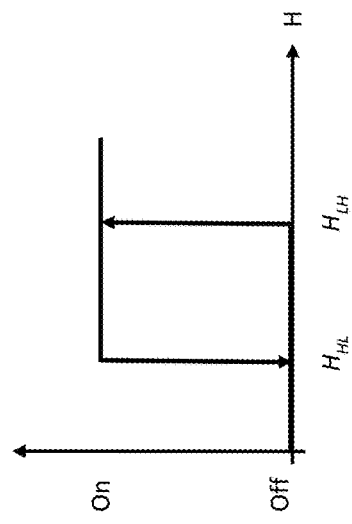
FIG. 7 illustrates the operation of a switch based on hysteresis.

The operation of this switch based on hysteresis is illustrated in FIG. 7. Specifically, if during the equalization process, the equalization mode is "off" and the entropy calculated rises above $H_{LH}$, the equalization process is activated. If the equalization mode is "on" and the entropy falls below $H_{HL}$, the equalization process is deactivated.

Note that this hysteresis cycle is implemented to prevent jumping between modes, which can affect the detection system (6). However and to further smooth the transition between modes, entropies calculated using a moving average are used instead of instantaneous entropies:

$$\widehat{H_r}(t) = \widehat{H_r}(t-1) \cdot (1-\rho) + H_r(t) \cdot \rho$$

with $\rho$ being a number between 0 and 1.

Furthermore, the remote equalization process is based on remotely defining the region of interest from the depth or scene information obtained by the image calibration system (5) for image acquisition devices (2) or image scanning systems (3), which are equipped with software that executes equalization processes. That is to say, the equalization process is performed by the image acquisition device (2) or the image scanning system (3) but on the region of interest defined from the depth or scene information obtained by the image calibration system (5).

The invention claimed is:

1. An image enhancement method for video analysis or automatic surveillance system, comprising;
   at least one image acquisition device through which an IR or thermal spectrum input image of an area of space is captured, the input image being digitized by the image acquisition device or an image digitizing system,
   a scene calibration system, and
   a detection system through which at least one type of object is detected;
   the method comprising:
   at least one processing stage in which a contrast of the input image is improved through the input image's depth or scene information obtained directly or indirectly by the scene calibration system or entered manually by a user, the at least one processing stage comprising at least one scene equalization stage defined from the input image's depth or scene information;
   the at least one scene equalization stage comprises at least the following steps:
   define a region of interest (r);
   calculate a histogram of the input image pixels contained in the region of interest $p_{I_r}(i)$ and use this information to obtain a corresponding transformation function $T_r$;
   wherein $$p_{I_r}(i) = p(I_r = i) = \frac{n_i}{n_r}$$

is a histogram of the region of interest formed by pixels of the input image contained in region r;
   wherein the transformation function $T_r$ is a transformation function whose calculation is based on the histogram of the pixels contained in the region of interest $T_r = f(p_{I_r}(i))$; and
   apply the transformation function $T_r$ to the entire input image I or sub-region $r_o$ of the input image and obtain an equalized image $O = T_r(r_o)$, wherein $r \subsetneq r_o \subseteq D_I$, wherein $D_I$ refers to a domain of the input image I and is defined as $D_I = [0, I_w-1] \times [0, I_h-1]$ wherein $I_w$ is a total width of the input image and $I_h$ is a full height of the input image,
   wherein the region of interest is defined with a rectangle $$r = [x, y, w, h] = [\alpha I_w, y_{hor}, \gamma I_w, \beta y_{hor}],$$

where x and y correspond to coordinates of an upper corner of r, w and h are width w and height h values of the region in pixels, $\alpha$, $\gamma$, $\beta \in (0,1)$ and $(\alpha+\gamma) < 1$; $I_w$ is a total width of the input image; and $y_{hor}$ is a vertical coordinate that defines a detection limit from which an expected size of a target object is smaller than a minimum size that the detection system can detect.

2. The image enhancement method for video analysis or automatic surveillance system according to claim 1, wherein the region of interest (r) comprises smaller target object types that are difficult for the detection system to detect.

3. The image enhancement method for video analysis or automatic surveillance system according to claim 2, wherein the region of interest (r) comprises at least all of the pixels for which an expected size of a target object is in the range $(T_{min}, T_{min} + \varepsilon(T_{max} - T_{min}))$; with
   $T_{min}$ being a minimum size of the target object that the detection system can detect;
   $T_{max}$ being a maximum possible size of the target object; and
   $\varepsilon$ is a number between 0 and 1.

4. The image enhancement method for video analysis or automatic surveillance system according to claim 1, wherein the equalization stage comprises at least one step that estimates a range of the histogram of the region of interest through calculation of an entropy in the region of interest in the following way:

$$H_r(t) = -\sum_r p_{I_r}(t) \cdot \log(p_{I_r}(t))$$

and another step that fixes at least two threshold values ($H_{HL}$ and $H_{LH}$) for which the equalization stage is activated or deactivated, respectively.

5. The image enhancement method for video analysis or automatic surveillance system according to claim 4, wherein the entropy is calculated using the following moving average $$\widehat{H_r}(t) = \widehat{H_r}(t-1) \cdot (1-\rho) + H_r(t) \cdot \rho$$

with $\rho$ being a number between 0 and 1.

6. The image enhancement method for video analysis or automatic surveillance system according to claim 1, further comprising an equalization smoothing stage in which a new image is obtained from a weighted sum of the equalized image and the input image in the following way:

$$I_F(x,y) = g(x,y) \cdot O(x,y) + (1 - g(x,y)) \cdot I(x,y)$$

wherein g(x,y) is any function whose value is maximum and equal to 1 in the center of the region of interest (r); I(x,y) is the input image, and O(x,y) is the equalized image.

7. The image enhancement method for video analysis or automatic surveillance system according to claim 6, wherein $$g(x,y) = e^{\frac{-1}{2}\left(\left(\frac{x-\mu_x}{\sigma_x}\right)^2 + \left(\frac{y-\mu_y}{\sigma_y}\right)^2\right)};$$

$$\mu = (\mu_x, \mu_y) = \left(\alpha l_w + \frac{\gamma l_w}{2}, y_{hor} - \frac{\beta y_{hor}}{2}\right);$$

$$\sigma = (\sigma_x, \sigma_y) = (\alpha l_w, \beta y_{hor}).$$

8. The image enhancement method for video analysis or automatic surveillance system according to claim 1, wherein the depth or scene information is obtained from a scene calibration system applying a calibration procedure consisting of at least the following phases:

a sample acquisition phase divided into the following sub-phases:
an image acquisition sub-phase;
an image processing sub-phase, which determines whether there is a moving object in the input image; and
a person pre-classification sub-phase, which determines whether or not the moving object is a person and stores its size and position information in case it is; and a calibration phase which obtains the size of a person for each position of the image based on the size and position data obtained for each object identified as a person in the sample acquisition phase.

9. The image enhancement method for video analysis or automatic surveillance system according to claim 8, wherein the region of interest (r) is defined as the transit area during the calibration procedure, this transit area being where samples are obtained during the sample acquisition phase.

10. The image enhancement method for video analysis or automatic surveillance system according to claim 8, wherein the region of interest (r) is obtained according to the procedure:

Divide the image into N resizable cells;
Mark the cells in which the scene calibration system has obtained at least one sample in the sample acquisition phase;
Define the region of interest (r) as a convex area that surrounds the marked cells.

11. The image enhancement system for video analysis or automatic surveillance system of claim 1, comprising functional elements suitable for carrying out a plurality of image enhancement procedures.

12. The image enhancement system for video analysis or automatic surveillance system according to claim 1, wherein the detection system, through which the at least one object type is detected, comprises at least:

a static scene segmentation system that classifies pixels into at least two types: moving objects and objects belonging to a background of the input image;
a candidate generation system which groups associated moving pixels into objects;
a classification system which classifies the objects according to whether or not they are target object types; and
a tracking system that maintains temporal coherence of the objects so that, depending on detection rules entered by the user, respective intrusion alarms can be generated.

13. The image enhancement system for video analysis or automatic surveillance system according to claim 12, wherein the image acquisition device is analog and the system consists of a digitizing stage for the image captured by the image acquisition device prior to the processing stage.

* * * * *